Patented Mar. 13, 1951

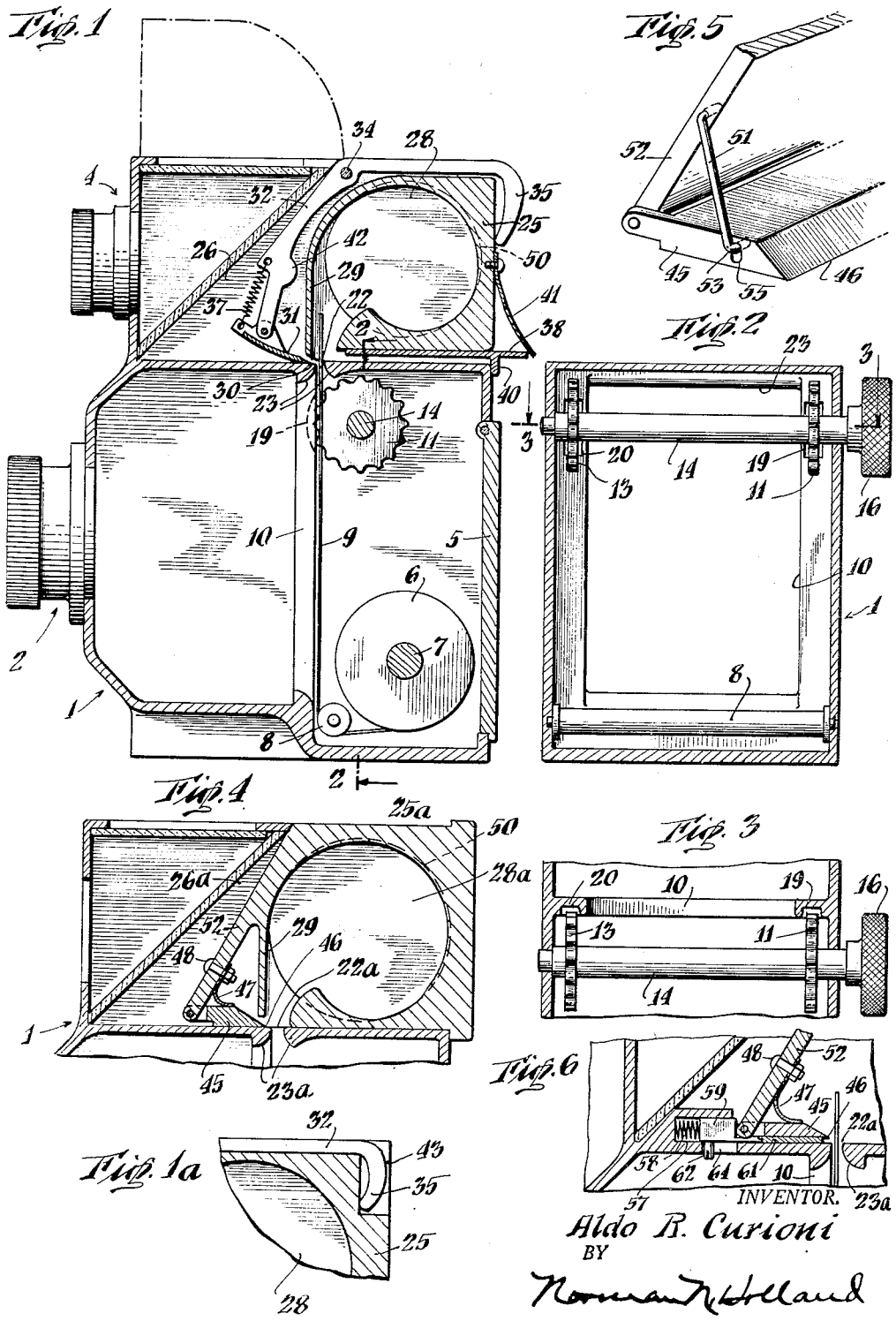

2,545,196

UNITED STATES PATENT OFFICE 2,545,196

PHOTOGRAPHIC CAMERA HAVING CUTOFF MEANS AND REMOVABLE FILM RECEPTACLE

Aldo R. Curioni, New York, N. Y.

Application May 3, 1947, Serial No. 745,780

3 Claims. (Cl. 95—31)

1

The present invention relates to photographic cameras and more particularly to cameras of the type utilized with rolls of film as distinguished from what may be referred to as plate cameras.

The great majority of cameras utilize rolls of film, the film being led from a spool or reel past a suitable opening in the camera. In order to obtain a representation on the film the lens is momentarily uncovered so that reflected light may strike the particular portion or length of film disposed at the camera opening. After so exposing a particular portion of a strip of film the film is moved so as to shift the exposed portion of film away from the camera opening and to position a new and unexposed length or portion of film at the camera opening. The process of exposing different portions or lengths of a film strip is repeated until the entire strip of film has been exposed, at which time the spool is removed from the camera and subjected to various developing, washing and fixing procedures.

Only after exposure and removal of the entire length of film is one able to process the film and to determine the success or failure of his picture-taking efforts. Usually pictures are taken over a considerable period of time so that a substantial time interval elapses from the taking of a first picture to the removal of the completely exposed spool of film from the camera. By the time the complete spool is removed from the camera the photographer will generally have forgotten the particular conditions of light, shutter opening, and exposure times which existed when the various pictures were taken; if one or more of the pictures is a failure the individual will know that he did something wrong when he took the picture. If the pictures are satisfactory he will know that his procedures were correct when the pictures were taken. However, unless notes are actually made of the various conditions or factors which existed at the time that the pictures were taken the photographer will not generally recall what conditions existed.

It would be desirable and advantageous if a photographer could take a picture and immediately thereafter remove it from the camera for subjection to the various treating processes. Under this latter procedure the photographer could have fresh in his mind the picture-taking conditions and if the picture is a failure he will know what particular condition should be corrected to avoid wasting additional frames of film. In addition, the latter advantageous procedure enables an ameteur to more quickly become proficient in taking pictures.

2

The present invention aims to provide a new and improved camera, or new and improved means, adapted to facilitate removal of exposed lengths of film from a camera prior to exposure of an entire roll or spool of film. The invention further contemplates the provision of new and improved means adapted to automatically sever a length of film upon removal or withdrawal of desired portions of film from a camera.

An object of the present invention is to provide new and improved means adapted to facilitate removal of a desired portion of film from a camera.

Another object of the invention is to provide new and improved means for facilitating removal of desired portions of film from a camera prior to completing exposure of an entire length of film.

Another object of the present invention is to provide new and improved means for automatically severing desired portions from a length of film.

Another object of the present invention is to provide improved means adapted to minimize objectionable exposure of film to light during intervals when desired portions of a film are being removed from a camera.

Still another object of the invention is to provide a camera embodying film severing means adapted to facilitate utilization of a complete length of film and hence to minimize wastage of film.

A still further object of the invention is to provide a new and improved combined camera and film severing means of compact and relatively simple construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a sectional view showing one embodiment of the invention;

Fig. 1a is a fragmentary sectional view showing a form of the invention similar to that of Fig. 1;

Fig. 2 is a sectional view taken along the line 2—2 of Fig. 1;

Fig. 3 is a fragmentary sectional view taken along the line 3—3 of Fig. 2;

Fig. 4 is a fragmentary sectional view showing a modified form of the present invention;

Fig. 5 is an enlarged fragmentary view showing one form of blade retaining means for Fig. 4; and Fig. 6 is an enlarged fragmentary view showing a portion of the device illustrated in Fig. 4.

Referring more particularly to Fig. 1, there is shown a camera comprising a casing 1 having a lens carried by a holder 2 and having a view finder 4. One side of the case, normally the back thereof, is shown provided with a cover 5 which may be opened to facilitate insertion of spools or rolls of film. The details of the lens and its mounting, view finder, shutters, et cetera, are shown generally as they, per se, form no part of the present invention.

A spool or roll of film to be developed is shown rotatably mounted on a pin or axle 7, the film passing around a suitable rod or roller 8 and thence upwardly past a film-exposing opening 10 of the camera 1.

The length of film which extends upwardly at the rear of or behind the camera opening 10 is adapted to be contacted adjacent the outer margins or edges thereof by feed members or flanges 11 and 13 carried by a shaft 14. The shaft 14 may be rotatably mounted in any suitable manner adjacent opposite ends thereof in the camera 1; preferably there is sufficient frictional contact between the shaft 14 and the means supporting it in the camera to retain the shaft in the particular position to which it is adjusted or rotated upon turning an actuating knob or handle 16. Any retaining means other than a friction fit may be relied upon to facilitate retention of the feed shaft 14 and feed discs 11 and 13 in the adjusted position.

The flanges or feed discs 11 and 13 carried by the shaft 14 preferably extend slightly into recessed portions 19 and 20 at opposite sides of the camera and are preferably provided with fluted, ribbed or milled peripheries. This construction facilitates obtaining a feeding "grip" on a length of film being fed through the camera. In instances where the film utilized is of the type having perforated marginal portions, the outwardly extending projections of the feed discs may fit into the perforations to feed the film forwardly in a manner similar to that of a sprocket fitting into the openings of a chain. In instances where the film utilized has an imperforate edge, the periphery of a feed disc may press the marginal portion of the film slightly toward or into the openings 19 and 20 to thus provide a surface contact or engagement of the feed discs with the film which facilitates correct feeding of the film through the camera. In some instances it may be desired to omit the flutes or projections from the feed discs and to utilize feed discs having substantially smooth surfaces. If desired, the feed discs or the outer edges thereof could be of some yieldable material such as rubber to facilitate resilient engagement thereof with the marginal portions of a strip of film movable through the camera.

Preferably both the spool of film 6 carried by the axle 7 and the feed shaft 14 with feed discs 11 are each positioned substantially behind the film-exposing opening 10. This construction provides a relatively compact camera, as will be further amplified hereinafter.

After leaving the feed discs 11 and 13, a length of film passes through a slot or opening 22 shown in the upper wall of the camera. The slot is preferably provided with curved, beveled or rounded portions 23 at opposite sides thereof to facilitate entry of a strip of film into and through the slot 22.

Upon emerging from the slot 22, the length of film enters a container, receptacle or holder designated generally by the reference character 25.

The receptacle or holder 25 is preferably disposed within an opening or chamber 26 of the camera and may be frictionally retained therein by engagement of its outer surfaces with the inner surfaces or walls of the chamber 26. If desired, some more positive form of catch or detent may be utilized to retain the holder within the chamber 26. When the receptacle or holder 25 is in operative position within the camera, an opening at the lower part thereof is adjacent the exit slot 22 of the camera 1 so that film may readily feed or be moved into the interior 28 of the holder 25.

To assist in correct positioning of a length of film within the holder 25, there is preferably provided a downwardly extending lip or apron 29 shown extending to a position adjacent the exit side of the camera slot 22. The lip or apron 29 tends to guide a length of film into the cavity or interior 28 of the holder 25. The film has a natural tendency to curl in the cavity 28, and the guiding apron 29 co-operates with the natural tendency of the film to curl and insures desirable feeding into the cavity.

Operatively associated with the receptacle 25 is a knife or shear blade 31 having a cutting edge 30. As shown in Fig. 1 of the drawings the blade is carried adjacent the lower end of a lever or bell crank 32, the bell crank being pivotally or rotatably mounted on a pin or other suitable means 34. A horizontally extending portion of the bell crank 32 is shown provided at its outer end with a downwardly extending tongue or projection 35. The relationship or association of the receptacle 25 with the bell crank 32 and shear blade 31 is preferably such that upon withdrawal of the receptacle from the camera (movement thereof to the right from the position shown in Fig. 1) it presses outwardly against the tongue 35 and causes the bell crank to pivot about the mounting means 34 so that the cutting edge 30 of the knife 31 moves across the exit slot 22 provided in the camera wall. In this manner withdrawal of the receptacle 25 from the camera causes the knife blade 31 to shear or cut off a length of film extending through the exit slot 22 into the receptacle 28. It will be understood that the width of the exit slot 22 of the camera wall and the width of the entrance slot of the receptacle 25 may be of any desired dimension to facilitate movement of film into the receptacle and most efficient shearing thereof.

The blade is shown positioned closely adjacent the upper edge of the film-exposing opening 10 so that the blade is adapted to shear off the film along a line closely adjacent the upper edge of the frame or picture defined by the camera opening 10. The entrance to the receptacle 25 is also closely adjacent the blade 31 and camera slot 22 so that film passes directly into the cavity of the receptacle. This construction is desirable as it facilitates utilizing all portions of the length of a strip of film.

As shown in Fig. 1 the shear blade 31 is connected, by a spring or other resilient means 37, at one end thereof with a portion of the bell crank 32. The spring 37 urges the cutting edge 30 of the blade 31 downwardly toward and against the surface of the camera wall adjacent the exit slot 22. When the receptacle 25 is withdrawn from the camera the area of the blade 31 behind the cutting edge moves across the exit slot 22 and forms a cover or seal which minimizes the possibility of light entering into the interior of the camera to spoil unexposed film contained therein.

It is also desirable to minimize the possibility of light entering the receptacle 25 through its film receiving opening and, as shown in Fig. 1, this may be achieved by a movable cover plate 38. The cover plate 38 may be movably associated by any suitable means with the receptacle 25 and is shown with a downwardly extending projection 40 adjacent the outer end thereof. When the receptacle is withdrawn from the camera a flat spring 41 carried by the receptacle may be used to urge the cover plate 38 toward the entrance opening of the receptacle to close the same against admission of light.

When the receptacle 25 is removed from the camera the tongue 35 will normally be disposed upwardly clear of the receptacle chamber 26, so that the receptacle may be freely inserted therein. As the receptacle is moved into the chamber 26 it may come into contact with a protuberance 42 of the bell crank 32 and press it inwardly, thus tending to move the tongue 35 downwardly to a position adjacent the end of the receptacle 25. The shear blade 31 moves away from the exit opening 22 of the camera and thus uncovers it. The projection 40 of the cover plate 38 comes into contact with a wall portion of the camera and serves to move the cover plate 38 away from the entrance opening of the receptacle, in opposition to the effect of the spring 41.

The bell crank and its parts, together with the receptacle 25, are preferably so related that movement of the receptacle in and out of the camera chamber 26 serves to shear a length of film and to automatically cover and uncover the exit and entrance openings of the camera and the receptacle.

It is not essential in every instance that the tongue 35 of the bell crank 32 extend outwardly beyond the outermost surface of the receptacle 25. In some instances it may be preferable to provide the receptacle with a recess 43 to contain the tongue 35. One form of such construction is indicated generally in Fig. 1a of the drawing.

Any desired number of frames or pictures may be removed from the camera at any time and subjected to suitable developing processes. A removable end cap or caps may be provided for the receptacle 25 to facilitate removal of lengths of film therefrom.

Preferably the receptacle 25 is formed of some suitable plastic, synthetic resin or other related material which is unaffected by developing and washing solutions. In this manner the receptacle and film may be removed from a camera and immersed directly into the various solutions without first removing the film from the receptacle.

It may be desirable in some instances to utilize a construction which does not automatically actuate the shear blade upon removal of the receptacle 25 from a camera. Such a construction may be obtained by eliminating the tongue 35 of the bell crank 32. For example, the bell crank 32 may terminate adjacent the location where the upper and rear walls of the receptacle 25 merge. In this instance the finger nail of a user may be inserted under the end of the bell crank lever to actuate the shear blade 31 for severing a film. Withdrawal of the receptacle 25 and automatic covering of the entrance opening thereof and camera opening is similar to that described hereinabove. Upon insertion of the receptacle into the camera chamber 26, the entrance and exit openings of the camera and receptacle are automatically uncovered as previously described.

In Figs. 4, 5 and 6 of the drawings there is shown a modified form of the invention. In this form a bell crank is not utilized for controlling the operation of a shear blade.

Adjacent the lower part of the receptacle or holder of Fig. 4, in proximity to the exit slot 22a, is shown a knife or blade 45, the lower edge of which rests against a surface of the camera and the cutting edge 46 of which is positioned in proximity to the exit opening or slot 22a of the camera. A spring or other resilient means 47, retained in position by a rivet or bolt 48, may be utilized to urge the knife or blade 45 downwardly so that the knife edge 46 is always pressed to a position adjacent the exit slot 22a.

Movement of the receptacle or holder 25a away from the camera, out of the chamber 26a, moves the cutting edge of the knife against the length of film which extends upwardly through the exit slot 22a and is effective to shear or cut off the film. Hence, when the receptacle is removed from the camera, film previously fed upwardly into the cavity 28a will be separated, along a line at the exit slot, from the portion or length of film remaining in the camera. The length of film or number of frames of film thus severed from film remaining in the camera may be removed from the receptacle or holder and subjected to various processing operations for developing a negative. Removal of the frames from the holder may be facilitated by providing a removable cap at one or both ends of the cavity in the receptacle or holder 25a. For example, there may be provided any suitable removable cap adapted to fit within a circular opening or groove 50 at one end of the holder.

As shown more particularly in Fig. 5, the knife or blade is adapted to be retained substantially in operating position at all times by a link or arm 51 which connects the blade with an adjacent portion 52 of the holder 25a. One end of the link 51 has a projection 53 extending into an opening or slot 55 of the blade. The construction allows the resilient means 47 to urge the blade downwardly firmly into contact with the underlying portion or surface of the camera and yet minimize the possibility of the cutting blade swinging freely to and fro upon removal of the holder from the camera.

To minimize the possibility of light leaking into the interior of the camera during such times as the holder is removed therefrom, the construction of Fig. 6 may be utilized. This figure shows an enlarged view of one means for providing this feature. As shown in this figure, a relatively small compartment 57 is formed or otherwise provided adjacent one portion of the holder, and the interior of the compartment contains a spring 58. The spring is adapted to normally press against a shoulder or portion 59 of a cover member to urge it outwardly toward the exit slot 22a; the shoulder 59 of the cover member is connected with a thin plate or extension 61, the latter being adapted to extend over the exit slot 22a upon removal of the receptacle from the camera. A pin 62 extending through a slot 64 may be provided to limit the extent of movement of the cover 61 in response to the effect of the spring 58. The thickness of the cover portion 61 is shown somewhat exaggerated in Fig. 6 in order to more clearly bring out the construction and operation of the parts. The portion 61 is preferably quite thin so that the cutting edge of the shear blade lies close to the upper surface of the camera adjacent the exit slot 22a and thus provides a shearing or cutting action of maximum effectiveness.

As pointed out hereinbefore in connection with Fig. 1 of the drawings, the shear blade is preferably positioned closely adjacent the upper edge of the film-exposing opening 10 so that the blade may cut off a film on a line close to the upper edge of a picture defined by the opening 10. The receptacle entrance portion is also closely adjacent the shear blade and the exit opening 22a so that film passes directly from the exit opening into the holder. All portions of the length of a strip of film may thus be utilized.

The present invention has been described generally with reference to its incorporation in or adaptation to a camera. In some instances it may be desirable to form the invention as a separate unit or adaptor that may be used with a camera. That is, a camera portion such as shown at the right side of Fig. 1 or Fig. 4, including the box-like chamber together with its film carrying reels 6, 7, film feeding means 11, 13, 14, film receptacle, and film severing means, may be manufactured as a unit. This unit may be provided with any suitable flanges, detents or catches adapted to facilitate assembly with a conventional camera. One example of usefulness of such a separate adaptor unit is with cameras of the film pack type; an adapt unit of the present invention may be readily assembled with such a camera and its operation is thereafter as described hereinabove.

It will be seen that the present invention provides a new and improved construction or device adapted to facilitate removal of frames or pictures from a camera prior to exposure of a complete length of film carried by a spool. It is not necessary to expose an entire roll of film prior to developing and inspecting the individual pictures. Each individual picture may be removed from the film or any number of pictures may be removed from the camera prior to exposure of the complete roll. If it is desired to develop the entire roll, this may be done in the manner customary with ordinary cameras. The construction permits ready removal and inspection of individual pictures and the correction of unsatisfactory conditions of exposure, timing, and the like.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a camera of the class described having a wall with a film exit slot therethrough, a removable receptacle adjacent said wall having an opening normally in alignment with said slot for admitting film to the receptacle, a lever member rotatably secured intermediate its ends to a portion of the camera having one leg portion extending along a wall of the receptacle and terminating adjacent said slot, a cutter blade rotatably mounted on said leg adjacent the terminal end thereof for rotation about an axis extending generally parallel to said slot, yieldable means connected with the lever member and with the cutter blade for urging the blade about its mounting and thereby urging a blade cutting edge toward said wall of the camera, and another leg of the lever member angularly disposed to said first leg and extending along another wall of the receptacle, movement of said other leg away from the receptacle moving said one leg and blade toward the exit slot to sever a film projecting therethrough.

2. In a camera of the class described having a wall with a film exit slot therethrough, a removable receptacle adjacent said wall having an opening normally in alignment with said slot for admitting film to the receptacle, a lever member rotatably secured intermediate its ends to a portion of the camera having one leg portion extending along a wall of the receptacle and terminating adjacent said slot, a cutter blade rotatably mounted on said leg adjacent the terminal end thereof for rotation about an axis extending generally parallel to said slot, yieldable means connected with the lever member and with the cutter blade for urging the blade about its mounting and thereby urging a blade cutting edge toward said wall of the camera, said lever member having another leg angularly disposed to said first leg and extending along another wall of the receptacle, and a projection extending from said other leg to a location adjacent a wall of the receptacle, movement of the receptacle away from the camera serving to press against said projection to thereby actuate said lever member and move the blade toward the exit slot for severing a film projecting therethrough.

3. A device as claimed in claim 2, wherein said receptacle is provided with a recess into which said projection extends when the receptacle opening is adjacent the film exit slot of the camera.

ALDO R. CURIONI.

REFERENCES CITED

The following references are of record in the file of this patent:

UNITED STATES PATENTS

| Number | Name | Date |
|--------|------|------|
| 1,424,816 | Grillone | Aug. 8, 1922 |
| 1,764,450 | Hindle | June 17, 1930 |
| 1,940,187 | Salchow | Dec. 19, 1933 |
| 1,976,594 | Anderson | Oct. 9, 1934 |
| 2,043,539 | Harrison et al. | June 9, 1936 |
| 2,095,849 | Wittel | Oct. 12, 1937 |
| 2,298,574 | Lockhart | Oct. 13, 1942 |
| 2,375,555 | Howard | May 8, 1945 |
| 2,403,717 | Harvey | June 9, 1946 |
| 2,420,046 | Loeb | May 6, 1947 |